United States Patent [19]

Rahn

[11] Patent Number: 5,490,709
[45] Date of Patent: Feb. 13, 1996

[54] HINGE FOR A FOLDING ROOF IN A CONVERTIBLE AUTOMOTIVE VEHICLE

[75] Inventor: Brian Rahn, St. Clair Shores, Mich.

[73] Assignee: ASC Incorporated, Southgate, Mich.

[21] Appl. No.: 163,374

[22] Filed: Dec. 7, 1993

[51] Int. Cl.⁶ .................................................. B60J 7/12
[52] U.S. Cl. ...................... 296/122; 296/108; 296/117
[58] Field of Search ................................. 296/107, 108, 296/116, 117, 121, 122, 124

[56] References Cited

U.S. PATENT DOCUMENTS

| | | |
|---|---|---|
| 3,047,332 | 7/1962 | Carpenter ............................. 296/116 |
| 3,442,551 | 5/1969 | Hussey ................................. 296/117 |
| 3,575,464 | 4/1971 | Himka et al. . | |
| 4,720,133 | 1/1988 | Alexander et al. . |
| 4,840,421 | 6/1989 | Hennessy . |
| 4,854,634 | 8/1989 | Shiraishi et al. . |
| 4,958,882 | 9/1990 | Kolb ..................................... 296/108 |
| 5,207,474 | 5/1993 | Licher et al. . |
| 5,251,952 | 10/1993 | Guckel et al. ................... 296/122 X |

FOREIGN PATENT DOCUMENTS 650980  8/1985  Switzerland .

*Primary Examiner*—Dean Kramer
*Attorney, Agent, or Firm*—Harness, Dickey & Pierce

[57] ABSTRACT

A hinge for a folding roof in an automotive vehicle has a pivoting mechanism coupling a front roof section to a rear roof section wherein the pivoting mechanism provides separation between the front roof and the rear roof prior to arcuate displacement thereof.

46 Claims, 5 Drawing Sheets

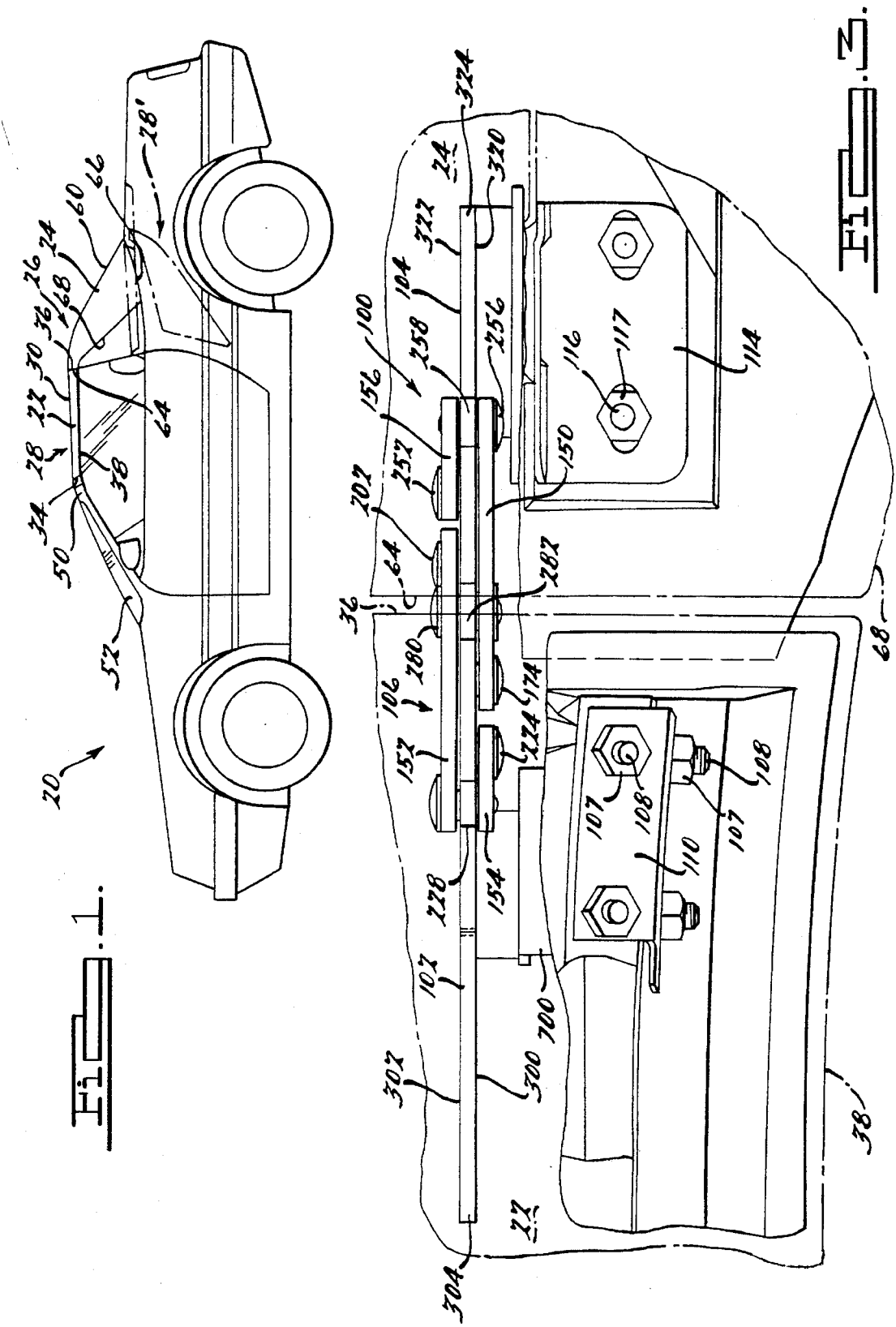

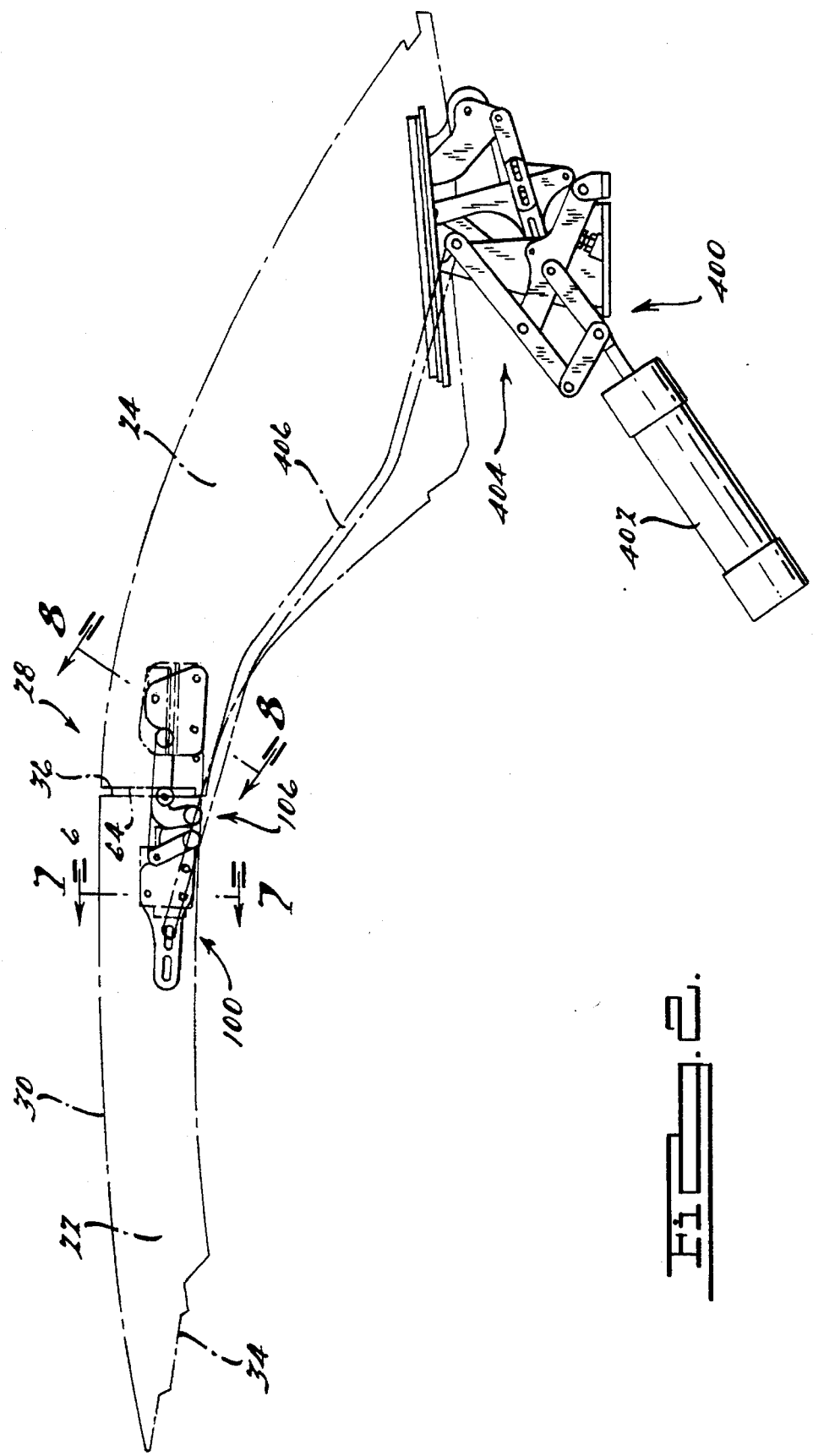

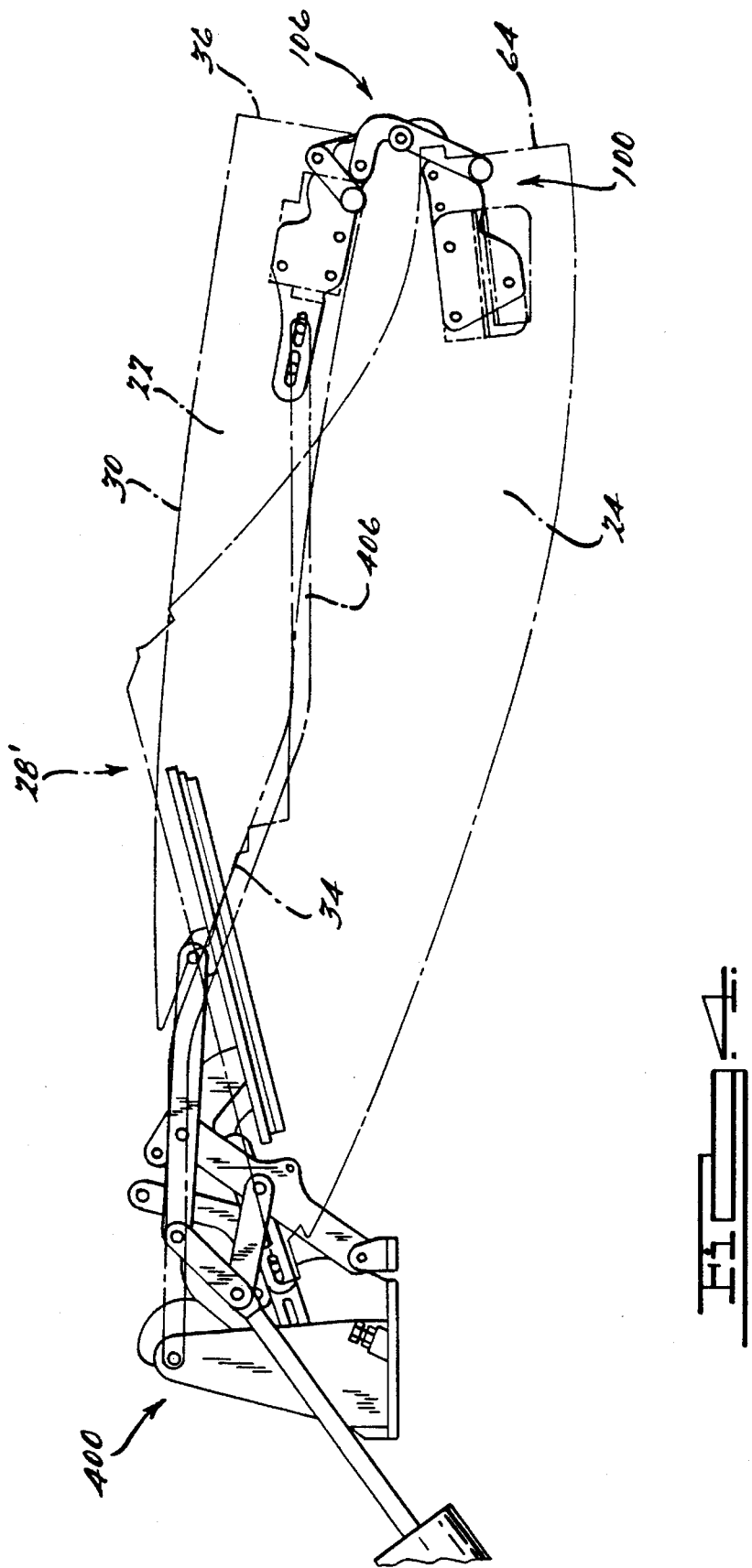

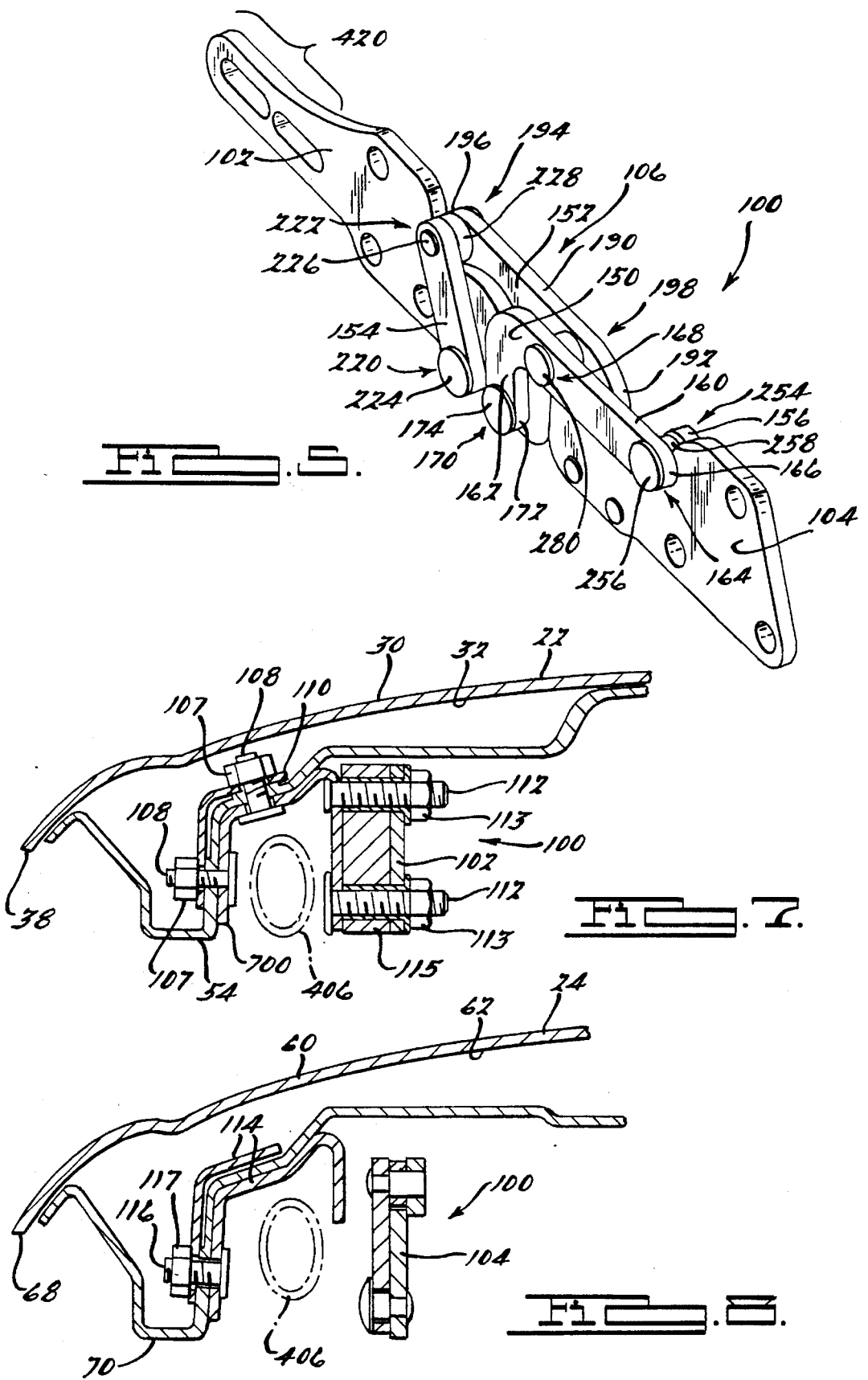

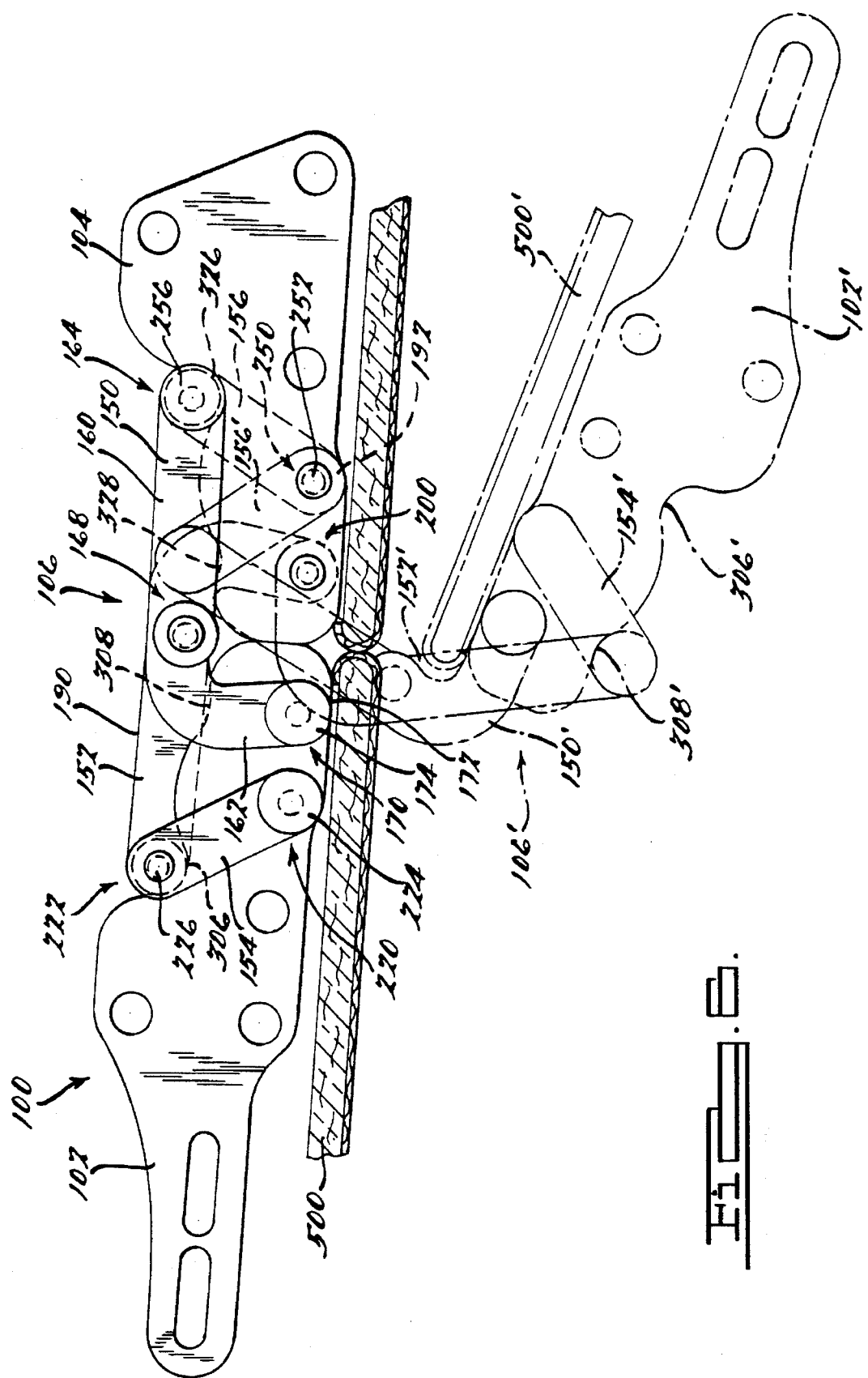

HINGE FOR A FOLDING ROOF IN A CONVERTIBLE AUTOMOTIVE VEHICLE

BACKGROUND AND SUMMARY OF THE INVENTION

This invention relates generally to convertible automotive vehicles and specifically to a hinge connecting a pair of folding roof panels in an automotive vehicle.

For convertible automobiles, it is common to have a roof structure which can be extended and retracted thereby covering or exposing a passenger compartment within the automotive vehicle. Such a convertible roof structure commonly employs a plurality of soft or hard-top roof panels which retractably slide or fold upon one another. In one hard-top roof structure, a hinging system that has traditionally been employed provides for a single pivot axis between a front roof and a rear roof. While such a simplistic hinge may be easily manufactured, this system usually requires a significant gap between a rearward edge of the front roof and a forward edge of the rear roof in order to allow clearance between the panels during folding. This limitation is further compounded by the front and rear roofs having a three-dimensionally curved shape.

More recently, a hinge mechanism has been employed which uses a plurality of gears and ball joints to provide a swinging movement between a front roof panel and a rear roof panel. Such a system is disclosed in U.S. Pat. No. 4,854,634 entitled "Upper Body Structure for a Convertible Vehicle" which issued to Shiraishi et al. on Aug. 8, 1989. A gear and ball joint type hinging system is disadvantageous since it can be expensive to manufacture and difficult to assemble.

Another mechanism is discussed in U.S. Pat. No. 4,840,421 entitled "Vehicle Convertible Top Frame Side Rail Unkage Assembly" which issued to Hennessy on Jun. 20, 1989. This mechanism employs a single straight linkage to pivotally connect adjacent side rails of a soft top roof. The linkage provides a circular pivot path since each end of the linkage is coupled to a side rail. Other linkages are used to facilitate a toggle-like actuation of the roof sections. As can be observed, the side rails have an undesirable clearance chamfer to allow pivoting.

Moreover, most conventional hinges require that an interior roof trim panel, otherwise known as a headliner, must have a portion cut away beneath each hinge to allow clearance during retraction. Not only does this cutout portion add to the manufacturing costs for the headliner but it also creates an unsightly appearance from within the automotive vehicle. Therefore, it would be desirable to have a hinge which separates prior to arcuate displacement, can be produced and assembled with a minimum of cost and does not require unsightly cutouts in a headliner thereby avoiding the aforementioned problems.

In accordance with the present invention, a new and useful hinge for a convertible automotive vehicle comprises a first member and a second member coupled to one another by a linkage mechanism. The first member is affixed to a front roof panel and the second member is affixed to a rear roof panel. The hinge of the present invention is advantageous over the prior art in that it has multiple pivot axes between the front and rear roofs. This provides for separation between roofs prior to arcuate displacement, thus, minimizing gaps between the roof sections when in a functional extended position. The present invention hinge is also easily installed within the roof structure. Another advantage is that the present invention hinge can be aesthetically covered by a headliner without requiring cutouts therein. Additionally, a further aspect of the present invention hinge provides an extended position stop and a retracted position stop between the front and rear roofs. Additional advantages and features of the present invention will become apparent from the following description and appended claims, taken in conjunction with the accompanying drawings.

BRIEF DESCRIPTION OF THE DRAWINGS

FIG. 1 is a side elevational view showing a folding hard-top of a convertible automotive vehicle in an extended and a retracted position within which a preferred embodiment of a hinge of the present invention is used;

FIG. 2 is a side elevational view of the hinge of the present invention shown in an extended position in relation to the folding hard-top of FIG. 1 and an actuation mechanism;

FIG. 3 is an enlarged top elevational view of a hinge of the present invention of FIG. 2 in relation to the folding hard-top;

FIG. 4 is a side elevational view of the hinge of the present invention of FIG. 2 shown in a retracted position in relation to the folding hard-top and actuation mechanism;

FIG. 5 is a perspective view of the hinge of the present invention of FIG. 2;

FIG. 6 is an enlarged side elevational view of the hinge of the present invention of FIG. 2 shown in the extended position and the retracted position in relation to a headliner;

FIG. 7 is a cross sectional view, taken along line 7—7 of FIG. 2, of the hinge of the present invention in relation to the folding hard-top; and FIG. 8 is a cross sectional view, taken along line 8—8 of FIG. 2, of the hinge of the present invention in relation to the folding hard-top.

DETAILED DESCRIPTION OF THE PREFERRED EMBODIMENT

In accordance with the present invention, a hinge is provided between folding or collapsible roof sections within a convertible automotive vehicle. The roof sections may be of a rigid hard-top or a fabric covered soft-top variety. More specifically, an exemplary hard-top automotive vehicle 20 is shown in FIGS. 1, 7 and 8. A rigid front roof 22 and a rigid rear roof 24 define a hard-top roof structure 26 which can be raised to an extended position 28 and collapsed to a retracted or stowed position 28'. Front roof 22 has an outside surface 30 and an inside surface 32 bordered by a forward edge 34, a rearward edge 36 and a pair of side edges 38. Forward edge 34 is detachably fastened to a front header 50 which borders a top edge of a windshield 52. A side rail 54 extends in a fore and aft direction and is attached to front roof 22 proximate with each side edge 38. Rear roof 24 is also defined by an outside surface 60 and an inside surface 62 which are bordered by a forward edge 64, a bottom edge 66 and a pair of side edges 68. As with front roof 22, rear roof 24 also has a side rail 70 extending in a fore and aft manner proximate with each side edge 68.

Referring to FIGS. 3, 5, 7 and 8, the preferred embodiment of a hinge 100 of the present invention is comprised of a first carrying plate or member 102, a second carrying plate or member 104 and a linkage or pivoting mechanism 106.

First member 102 is fastened to side rail 54 and, in turn, front roof 22 by a bracket 700, a bracket 110, a plurality of weld nuts 107 and a corresponding plurality of bolts 108. First member 102 is attached to bracket 700 through a plurality of threaded weld studs 112, a plurality of nuts 113 and a spacer 115. Similarly, second member 104 is attached to side rail 70 and, in turn, rear roof 24 by a pair of brackets 114, a plurality of weld nuts 117 and a corresponding plurality of bolts 116.

As can best be observed in FIGS. 3, 5 and 6, linkage mechanism 106 is comprised of a first L-shaped link 150, a second L-shaped link 152, a first intermediate link 154 and a second intermediate link 156. First L-shaped link 150 is defined by an elongated arm 160 and a shortened arm 162. Elongated arm 160 has a first pivot portion 164 near an end 166 thereof. Elongated arm 160 further has a second pivot portion 168 proximate with an intersection between elongated arm 160 and shortened arm 162. Shortened arm 162 also has a pivot portion 170 near an end 172 thereof. First L-shaped link 150 is rotatably coupled to first member 102 at pivot portion 170 by a rivet 174. Second L-shaped link 152 similarly has an elongated arm 190 and a shortened arm 192. Elongated arm 190 has a first pivot portion 194 near an end 196 thereof and has a second pivot portion 198 proximate with an intersection between elongated arm 190 and shortened arm 192. Shortened arm 192 also has a pivot portion 200 rotatably coupled to second member 104 by a rivet 202.

First intermediate link 154 has a first pivot portion 220 and a second pivot portion 222. First pivot portion 220 is rotatably coupled to first member 102 by a rivet 224. Furthermore, second pivot portion 222 is rotatably coupled to first pivot portion 194 of second L-shaped link 152 through a rivet 226. An annular spacer 228 is juxtapositioned between first intermediate link 154 and second L-shaped link 152. Spacer 228 is coaxially aligned with rivet 226. First intermediate link 154 has a substantially straight configuration between pivot portions 220 and 222. Second intermediate link 156 is also a substantially straight member having a first pivot portion 250 rotatably coupled with second member 104 through a rivet 252. Second intermediate link 156 further has a second pivot portion 254 rotatably coupled to first pivot portion 164 of first L-shaped link 150 by a rivet 256. An annular spacer 258, coaxially surrounding rivet 256, separates second intermediate link 156 from first L-shaped link 150. A rivet 280 rotatably couples second pivot portion 168 of first L-shaped link 150 to second pivot portion 198 of second L-shaped link 152. An annular spacer 282 is coaxially aligned with rivet 280 and separates first and second L-shaped links 150 and 152, respectively.

First member 102 has a first face 300 and a second face 302 bordered by a peripheral edge 304. Peripheral edge 304 further has an extended position stop formation 306 and a retracted position stop formation 308 formed therein. Similarly, second member 104 has a first face 320 and a second face 322 bordered by a peripheral edge 324. An extended position stop formation 326 and a retracted position stop formation 328 are located along peripheral edge 324. Moreover, first and second members 102 and 104, respectively, are in planar alignment with one another. First member 102, second member 104, first L-shaped link 150, second L-shaped link 152, first intermediate link 154, second intermediate link 156 and spacers 228, 258 and 282 are all preferably made from steel. A second hinge, identical with hinge 100, is located symmetrically opposite therefrom at the transverse or cross car side of vehicle 20 (see FIG. 1). Accordingly, the second hinge provides third and fourth members, L-shaped links and intermediate links (not shown).

The operation of hinge 100 is shown in FIGS. 2, 4 and 6. Front and rear roofs, respectively 22 and 24 are retractably and extendably driven by a pair of actuation mechanisms 400. Each actuation mechanism 400 is comprised of a hydraulic or pneumatic piston 402 affixed to automotive vehicle 20 (see FIG. 1), a multi-linkage system 404 and a balance link 406. Balance link 406 rotatably couples front roof 22 to multi-linkage system 404. Balance link 406 is preferably coupled to bracket 700 which is mounted to side rail 54 but may also be rotatably coupled to an optional tang 420 (see FIG. 5) of first member 102.

Linkage mechanism 106 of hinge 100 provides separation between front roof 22 and rear roof 24 during arcuate movement between extended position 28 (FIG. 2) and retracted position 28' (FIG. 4). This separation allows front roof 22 to fold upon rear roof 24 in a clamshelling manner without requiring unsightly cutouts in a headliner 500 or the roofs themselves. Furthermore, hinge 100 of the present invention uses multiple pivot axes to accomplish this separation. The arcuate displacement may take the form of an involute pivot path. This hinge 100 achieves a low profile and is easy to construct. Moreover, by placing links on opposing faces of first and second members 102 and 104, respectively, torsional stiffening is increased within hinge 100.

When front roof 22 is fully collapsed upon rear roof 24 in retracted position 28', first spacer 228 abuts against retracted position stop formation 308 of first member 102. Simultaneously, second spacer 258 abuts against retracted position stop formation 328 of second member 104. Alternatively, when front and rear roofs, respectively 22 and 24, are in fully extended position 28, first spacer 228 abuts against extended position stop formation 306 of first member 102. Also, second spacer 258 abuts against extended position stop formation 326 of second member 104. These stop formations provide a rigid abutting surface thereby insuring the desired registry of front roof 22 to rear roof 24 when extended or retracted. This also prevents undesirable interference contacts between painted roof surfaces.

While the preferred embodiments of a hinge of the present invention has been disclosed, it will be appreciated that various modifications may be made without departing from the present invention. For example, while a specific linkage mechanism employing four links for each hinge has been shown, more or less links may be used to achieve an involute rotational path. Furthermore, the linkage mechanism can be rotatably coupled directly to the front and rear roofs or to side rail members without the use of carrying members or plates. Many other actuation mechanisms can of course be used in combination with the present invention hinge. Arcuate path shapes other than involute ones can also be created during folding of the roof sections. Additionally, the hinge of the present invention may be used in a folding soft-top convertible roof as well as in the exemplary hard-top roof disclosed herein. While various materials have been disclosed in an exemplary fashion, a variety of other materials may of course be employed. It is intended by the following claims to cover these and any other departures from these disclosed embodiments which fall within the true spirit of this invention.

What is claimed is:

1. A hinge for a folding roof structure used in an automotive vehicle, said folding roof structure having a front roof section and a rear roof section, said hinge comprising:

a first member affixed to said front roof section;

a second member affixed to said rear roof section;

a linkage mechanism coupling said first member to said second member adjacent thereto, said linkage mechanism providing separation between said front roof section and said rear roof section during arcuate relative displacement of said sections;

said linkage mechanism including:

a first L-shaped link being defined by a first elongated arm and a first shortened arm, said first elongated arm having a first pivot portion at an end and having a second pivot portion proximate to an intersection between said first elongated arm and said first shortened arm, said first shortened arm having a pivot portion rotatably coupled to said first member;

a second L-shaped link having a second elongated arm and a second shortened arm, said second elongated arm having a first pivot portion at an end and having a second pivot portion proximate to an intersection between said second elongated arm and said second shortened arm, said second shortened arm having a pivot portion at an end rotatably coupled to said second member, said first L-shaped link rotatably coupled to said second L-shaped link at said second pivot portion of each of said first and second elongated arms;

a first intermediate link having a first pivot rotatably coupled to said first member, said first intermediate link further having a second pivot rotatably coupled with said first pivot portion of said first elongated arm of said first L-shaped link; and a second intermediate link having a third pivot rotatably coupled with said second member, said second intermediate link further having a fourth pivot rotatably coupled with said first pivot portion of said second elongated arm of said second L-shaped link.

2. The hinge of claim 1 wherein:

said first L-shaped link and said first intermediate link are in mirrored symmetry with said second L-shaped link and said second intermediate link.

3. The hinge of claim 2 wherein:

said shortened arms of said first and second L-shaped links project in a substantially downward direction from said elongated arms when said front and rear roof sections are in an extended position.

4. The hinge of claim 3 wherein:

said first and second members are in planar alignment with one another.

5. The hinge of claim 4 wherein:

said first L-shaped link and said first intermediate link are adjacent to a first face of said first and second members; and said second L-shaped link and said second intermediate link are adjacent to a second face of said first and second members, said first and second faces of said first and second members are parallel to one another.

6. The hinge of claim 5 further comprising:

a first spacer being disposed between said first L-shaped link and said second intermediate link; and a second spacer being disposed between said second L-shaped link and said first intermediate link.

7. The hinge of claim 6 wherein:

said first member has an extended position stop formation against which said first spacer abuts when said front roof section and said rear roof section are in said fully extended position; and said second member has an extended position stop formation against which said second spacer abuts when said front roof section and said rear roof section are in said extended position.

8. The hinge of claim 6 wherein:

said first member has a retracted position stop formation against which said first spacer abuts when said front roof section and said rear roof section are in said retracted position; and said second member has a retracted position stop formation against which said second spacer abuts when said front roof section and said rear roof section are in said retracted position.

9. The hinge of claim 1 wherein:

said first and second intermediate links have a straight configuration.

10. The hinge of claim 1 used in said roof structure, said roof structure being further defined by:

said front roof section and said rear roof section retractably and extendably driven by an actuation mechanism.

11. The hinge of claim 10 used with said actuation mechanism, said actuation mechanism being further defined by:

a balance link having a distal end pivotably coupled to said front roof section.

12. The hinge of claim 10 used with said actuation mechanism, said actuation mechanism being further defined by:

a balance link having a distal end pivotably coupled to said first member.

13. The hinge of claim 1 used in said roof structure, said roof structure being further defined by:

said front roof section having an outside surface and an inside surface bordered by a forward edge and a rearward edge, said front roof section being entirely rigid;

said rear roof section having an outside surface and an inside surface bordered by a forward edge; and said front roof section folding inwardly upon said rear roof section during retraction such that said forward edge of said rear roof section moves in a substantially rearward and downward direction so as to invert said rear roof section, said inside surface of said front roof section folding upon said inside surface of said rear roof section.

14. The hinge of claim 1 used in said roof structure, said roof structure being further defined by:

said front roof section which is rigid and said rear roof section which is rigid.

15. The hinge of claim 1 comprising:

a third member affixed to said front roof section;

a fourth member affixed to said rear roof section;

a second linkage mechanism coupling said third member to said fourth member, said second linkage mechanism providing separation between said front roof section and said rear roof section during arcuate relative displacement of said sections; and said third and fourth members being symmetrically displaced along said front and rear roof sections, respectively, in transversely opposite positions relative to said first and second members.

16. The hinge of claim 1 wherein:

said arcuate displacement defines an involutely shaped pivot path.

17. A hinge for a folding hard-top used in an automotive vehicle, said folding hard-top being defined by a rigid front roof section and a rigid rear roof section, said front roof section having an outside surface and an inside surface bordered by a forward edge and a rearward edge, said rear roof section having an outside surface and an inside surface bordered by a forward edge, said hinge comprising a pivoting mechanism coupling said front roof section to said rear roof section, said pivoting mechanism providing separation between said front roof section and said rear roof section during arcuate relative displacement of said sections;

a first L-shaped link of said pivoting mechanism being defined by a first elongated arm and a first shortened arm, said first elongated arm having a first pivot portion at an end and having a second pivot portion proximate to an intersection between said first elongated arm and said first shortened arm, said first shortened arm having a pivot portion rotatably coupled to said front roof;

a second L-shaped link of said pivoting mechanism having a second elongated arm and a second shortened arm, said second elongated arm having a first pivot portion at an end and having a second pivot portion proximate to an intersection between said second elongated arm and said second shortened arm, said second shortened arm having a pivot portion at an end rotatably coupled to said rear roof, said first L-shaped link rotatably coupled to said second L-shaped link at said second pivot portion of each of said elongated arms;

a first intermediate link of said pivoting mechanism having a first pivot rotatably coupled to said front roof section, said first intermediate link further having a second pivot rotatably coupled with said first pivot portion of said first elongated arm of said first L-shaped link; and a second intermediate link of said pivoting mechanism having a third pivot rotatably coupled with said rear roof section, said second intermediate link further having a fourth pivot rotatably coupled with said first pivot portion of said second elongated arm of said second L-shaped link.

18. The hinge of claim 17 wherein:

said first L-shaped link and said first intermediate link are in mirrored symmetry with said second L-shaped link and said second intermediate link.

19. The hinge of claim 17 further comprising:

a first carrying member being affixed to said front roof section, said pivot portion of said first L-shaped link shortened arm being pivotably coupled to said first carrying member, said first pivot portion of said first intermediate link also being pivotably coupled to said first carrying member; and a second carrying member being affixed to said rear roof section, said pivot portion of said second L-shaped link shortened arm being pivotably coupled to said second carrying member, said first pivot portion of said first intermediate link also being pivotably coupled to said second carrying member.

20. The hinge of claim 19 wherein:

said first and second carrying members are in planar alignment with one another.

21. The hinge of claim 20 wherein:

said first L-shaped link and said first intermediate link are adjacent to a first face of said first and second carrying members; and said second L-shaped link and said second intermediate link are adjacent to a second face of said first and second carrying members, said first and second faces of said first and second carrying members are parallel to one another.

22. The hinge of claim 21 further comprising:

a first spacer being disposed between said first L-shaped link and said second intermediate link; and a second spacer being disposed between said second L-shaped link and said first intermediate link.

23. The hinge of claim 22 wherein:

said first carrying member has an extended position stop formation against which said first spacer abuts when said front roof section and said rear roof section are in said fully extended position; and said second carrying member has an extended position stop formation against which said second spacer abuts when said front roof section and said rear roof section are in said extended position.

24. The hinge of claim 22 wherein:

said first carrying member has a retracted position stop formation against which said first spacer abuts when said front roof section and said rear roof section are in said fully retracted position; and said second carrying member has a retracted position stop formation against which said second spacer abuts when said front roof section and said rear roof section are in said retracted position.

25. The hinge of claim 19 comprising:

a third carrying member being affixed to said front roof section;

a fourth carrying member being affixed to said rear roof section;

a second pivoting mechanism coupling said third carrying member to said fourth carrying member said second pivoting mechanism providing separation between said front roof section and said rear roof section prior to arcuate relative displacement of said sections;

said third and fourth carrying members being symmetrically displaced along said front and rear roof sections, respectively, in transversely opposite positions relative to said first and second carrying members.

26. The hinge of claim 17 wherein:

said shortened arms of said first and second L-shaped links project in a substantially downward direction from said elongated arms when said front and rear roof sections are in an extended position.

27. The hinge of claim 17 wherein:

said front roof section folds inwardly upon said rear roof section during retraction such that said forward edge of said rear roof section moves in a substantially rearward and downward direction so as to invert said rear roof section, said inside surface of said front roof section folds upon said inside surface of said rear roof section said front roof section is entirely rigid.

28. The hinge of claim 17 wherein: said first and second intermediate links have a straight configuration.

29. The hinge of claim 17 used in said folding hard top, said hard top being further defined by:

said front roof section and said rear roof section retractably and extendably driven by an actuation mechanism.

30. The hinge of claim 29 used with said actuation mechanism, said actuation mechanism being further defined by:

said actuation mechanism including a balance link.

31. The hinge of claim 17 wherein:

said arcuate displacement defines an involutely shaped pivot path.

32. A hinge for a folding hard-top used in an automotive vehicle, said folding hard-top being defined by a rigid front roof section and a rigid rear roof section, said front roof section having an outside surface and an inside surface bordered by a forward edge and a rearward edge, said rear roof section having an outside surface and an inside surface bordered by a forward edge and a bottom edge, said hinge comprising:

a first member being affixed to said front roof section proximate to said rearward edge;

a second member being affixed to said rear roof section proximate to said forward edge;

a first L-shaped link coupling said first member to said second member, said first L-shaped link being defined by a first elongated arm and a first shortened arm said first elongated arm having a first pivot portion at an end and a second pivot portion proximate to an intersection between said first elongated arm and said first shortened arm said first shortened arm having a pivot portion rotatably coupled to said first member;

a second L-shaped link having a second elongated arm and a second shortened arm said second elongated arm having a first pivot portion at an end and a second pivot portion proximate to an intersection between said second elongated arm and said second shortened arm said second shortened arm having a pivot portion at an end rotatably coupled to said second member, said first L-shaped link being rotatably coupled to said second L-shaped link at said second pivot portion of each of said elongated arms;

a first intermediate link having a first pivot rotatably coupled to said first member said first intermediate link further having a second pivot rotatably coupled with said first pivot portion of said first elongated arm of said first L-shaped link;

a second intermediate link having a third pivot rotatably coupled with said second member said second intermediate link further having a fourth pivot rotatably coupled with said first pivot portion of said second elongated arm of said second L-shaped link;

said first L-shaped link and said first intermediate link being in mirrored symmetry with said second L-shaped link and said second intermediate link, said shortened arms of said first and second L-shaped links projecting in a substantially downward direction from said elongated arms when said front and rear roof sections are in an extended position; and said first and second members being in planar alignment with one another, said first L-shaped link and said first intermediate link being adjacent to a first face of said first and second members, said second L-shaped link and said second intermediate link being adjacent to a second face of said first and second members, said first and second faces of said first and second members being parallel to one another.

33. A hinge for a folding roof structure used in an automotive vehicle, said folding roof structure having a front roof section and a rear roof section, said front roof section further having an outside surface and an inside surface bordered by a forward edge and a rearward edge, said rear roof section having an outside surface and an inside surface bordered by a forward edge, said hinge comprising:

a first member being affixed to said front roof section proximate with said rearward edge;

a second member being affixed to said rear roof section proximate with said forward edge;

a pivoting mechanism coupling said front roof section to said rear roof section;

said front roof section and said rear roof section being retractably and extendably driven by an actuation mechanism;

said first member having an extended position stop formation against which a portion of said pivoting mechanism between ends thereof abuts when said front roof section and said rear roof section are in a fully extended position;

said second member having an extended position stop formation against which said pivoting mechanism abuts when said front roof section and said rear roof section are in said fully extended position;

said first member having a retracted position stop formation against which said pivoting mechanism abuts when said front roof section and said rear roof section are in a fully retracted position; and said second member having a retracted position stop formation against which said pivoting mechanism abuts when said front roof section and said rear roof section are in said fully retracted position.

34. The hinge of claim 33 wherein:

said front roof section folds inwardly upon said rear roof section during retraction such that said forward edge of said rear roof section moves in a substantially rearward and downward direction so as to invert said rear roof section, said inside surface of said front roof section folds upon said inside surface of said rear roof section.

35. The hinge of claim 33 wherein:

said pivoting mechanism provides separation between said front roof section and said rear roof section during arcuate relative displacement of said sections.

36. A hinge for a folding roof structure used in an automotive vehicle, said folding roof structure having a front roof section and a rear roof section, said hinge comprising:

a linkage mechanism coupling and providing separation between said front roof section and said rear roof section during arcuate relative displacement of said sections;

said front roof section having an outside surface and an inside surface bordered by a forward edge and a rearward edge, said front roof section being entirely rigid; said rear roof section having an outside surface and an inside surface bordered by a forward edge, said rear roof section being entirely rigid;

said front section folding inwardly upon said rear roof section during retraction such that said forward edge of said rear roof section moves in a substantially rearward and downward direction so as to invert said rear roof section, said inside surface of said front roof section folding upon said inside surface of said rear roof section; said linkage mechanism including:

a first member being affixed to said front roof section;

a second member being affixed to said rear roof section; and a first L-shaped link being defined by an elongated arm and a shortened arm, said elongated arm having a first pivot portion at an end and a second pivot portion proximate with an intersection between said elongated arm and said shortened arm, said shortened arm having a pivot portion rotatably coupled to said first member.

37. The hinge of claim 36 wherein said linkage mechanism further includes:

a second L-shaped link having a second elongated arm and a second shortened arm said second elongated arm having a first pivot portion at an end and having a second pivot portion proximate to an intersection between said second elongated arm and said second shortened arm said second shortened arm having a pivot portion at an end rotatably coupled to said second member said first L-shaped link rotatably coupled to said second L-shaped link at said second pivot portion of each of said elongated arms;

a first intermediate link having a first pivot rotatably coupled to said first member said first intermediate link further having a second pivot rotatably coupled with said first pivot portion of said first elongated arm of said first L-shaped link; and a second intermediate link having a third pivot rotatably coupled with said second member said second intermediate link further having a fourth pivot rotatably coupled with said first pivot portion of said second elongated arm of said second L-shaped link.

38. The hinge of claim 37 wherein:

said first L-shaped link and said first intermediate link are in mirrored symmetry with said second L-shaped link and said second intermediate link;

said shortened arms of said first and second L-shaped links project in a substantially downward direction from said elongated arms when said front and rear roof sections are in an extended position;

said first and second members are in planar alignment with one another;

said first L-shaped link and said first intermediate link are adjacent to a first face of said first and second members; and said second L-shaped link and said second intermediate link are adjacent to a second face of said first and second members, said first and second faces of said first and second members are parallel to one another.

39. The hinge of claim 37 further comprising:

a first spacer being disposed between said first L-shaped link and said second intermediate link coupled thereto; and a second spacer being a disposed between said second L-shaped link and said first intermediate link coupled thereto.

40. The hinge of claim 37 wherein:

said first and second intermediate links have a straight configuration.

41. The hinge of claim 36 used in said roof structure, said roof structure being further defined by:

said front roof section and said rear roof section retractably and extendably driven by an actuation mechanism.

42. The hinge of claim 41 used with said actuation mechanism, said actuation mechanism being further defined by:

said actuation mechanism including a balance link having a distal end pivotably coupled to said front roof section.

43. The hinge of claim 41 used with said actuation mechanism, said actuation mechanism being further defined by:

said actuation mechanism including a balance link having a distal end pivotably coupled to said linkage mechanism.

44. The hinge of claim 36 further comprising:

a third member being affixed to said front roof section;

a fourth member being affixed to said rear roof section;

a second linkage mechanism coupling said third member to said fourth member said second linkage mechanism providing separation between said front roof section and said rear roof section prior to arcuate relative. displacement of said sections; and said third and fourth members being symmetrically displaced along said front and rear roof sections, respectively, in transversely opposite positions relative to said first and second members.

45. A hinge for a folding roof structure used in an automotive vehicle, said folding roof structure having a front roof section and a rear roof section, said hinge comprising:

a linkage mechanism coupling and providing separation between said front roof section and said rear roof section during arcuate relative displacement of said sections;

said front roof section having an outside surface and an inside surface bordered by a forward edge and a rearward edge, said front roof section being entirely rigid;

said rear roof section having an outside surface and an inside surface bordered by a forward edge, said rear roof section being entirely rigid;

said front roof section folding inwardly upon said rear roof section during retraction such that said forward edge of said rear roof section moves in a substantially rearward and downward direction so as to invert said rear roof section, said inside surface of said front roof section folding upon said inside surface of said rear roof section;

a first member affixed to said front roof section having an extended position stop formation against which a first spacer abuts when said front roof section and said rear roof section are in said fully extended position; and a second member affixed to said rear roof section having an extended position stop formation against which a second spacer abuts when said front roof section and said rear roof section are in said extended position, said spacers each being mounted upon sections of said linkage mechanism movable relative to said members.

46. The hinge of claim 45 wherein:

said first member has a retracted position stop formation against which said first spacer abuts when said front roof section and said rear roof section are in said retracted position; and said second member has a retracted position stop formation against which said second spacer abuts when said front roof section and said rear roof section are in said retracted position.

* * * * *

UNITED STATES PATENT AND TRADEMARK OFFICE
CERTIFICATE OF CORRECTION

PATENT NO. : 5,490,709                                Page 1 of 2
DATED      : February 13, 1996
INVENTOR(S): Brian Rahn It is certified that error appears in the above-indentified patent and that said Letters Patent is hereby corrected as shown below:

Column 1, line 38, "Unkage" should be -- Linkage --.

Column 8, line 54, begin new paragraph with "said".

Column 9, line 15, after "arm" (second occurrence) insert -- , --.

Column 9, line 19, after "arm" (first occurence) insert -- , --.

Column 9, line 22, after "arm" (first occurence) insert -- , --.

Column 9, line 25, after "arm" (second occurence) insert -- , --.

Column 9, line 32, after "member" insert -- , --.

Column 9, line 37, after "member" insert -- , --.

Column 10, line 46, begin new paragraph with "said".

Column 10, line 55, begin new paragraph with "said".

Column 11, line 6, after "arm" (first occurrence) insert -- , --.

UNITED STATES PATENT AND TRADEMARK OFFICE
CERTIFICATE OF CORRECTION

PATENT NO. : 5,490,709
DATED : February 13, 1996
INVENTOR(S) : Brian Rahn

It is certified that error appears in the above-indentified patent and that said Letters Patent is hereby corrected as shown below:

Column 11, line 8, after "member" insert --, --.

Column 11, line 12, after "member" insert -- , --.

Column 11, line 17, after "member" insert -- , --.

Column 11, line 34, begin new paragraph wth "said".

Column 11, line 42, delete "a" (second occurrence).

Column 12, line 8, after "member" insert -- , --.

Column 12, line 10, delete ".".

Signed and Sealed this

Twenty-seventh Day of August, 1996

BRUCE LEHMAN

Attest:

*Attesting Officer*  *Commissioner of Patents and Trademarks*